United States Patent
Li

(10) Patent No.: US 7,895,393 B2
(45) Date of Patent: Feb. 22, 2011

(54) RAID SYSTEM AND THE OPERATING METHOD FOR THE SAME

(75) Inventor: De-Jian Li, Taipei (TW)

(73) Assignee: Via Technologies, Inc., Hsin-Tien, Taipei (TW)

( * ) Notice: Subject to any disclaimer, the term of this patent is extended or adjusted under 35 U.S.C. 154(b) by 567 days.

(21) Appl. No.: 11/869,254

(22) Filed: Oct. 9, 2007

(65) Prior Publication Data

US 2008/0195809 A1 Aug. 14, 2008

(30) Foreign Application Priority Data

Feb. 12, 2007 (TW) .............................. 96105052 A

(51) Int. Cl.
*G06F 13/00* (2006.01)
(52) U.S. Cl. ................... 711/114; 711/112; 714/6; 714/800; 707/741
(58) Field of Classification Search ................ 711/112, 711/114; 714/6, 800; 707/741
See application file for complete search history.

(56) References Cited

U.S. PATENT DOCUMENTS

2005/0050381 A1 3/2005 Maddock

2005/0229023 A1* 10/2005 Lubbers et al. ................ 714/4

FOREIGN PATENT DOCUMENTS

| TW | 200602851 | 1/2006 |
| TW | I273398 | 2/2007 |

OTHER PUBLICATIONS

English language translation of abstract of TW 200602851 (pp. 3-4 of publication, published Jan. 16, 2006).
English language translation of abstract of TW I273398 (pp. 3-4 of publication, published Feb. 11, 2007).

* cited by examiner

*Primary Examiner*—Hong Kim
*Assistant Examiner*—Jae U Yu
(74) *Attorney, Agent, or Firm*—Thomas, Kayden, Horstemeyer & Risley

(57) ABSTRACT

The invention discloses Redundant Array of Inexpensive Disks (RAID) systems, utilizing a RAID descriptor having compatibility for different RAID levels. When the RAID system is set to realize RAID 5, the RAID descriptor comprises a first RAID sub-descriptor. When the RAID system is set to realize RAID 6, in addition to the first RAID sub-descriptor, the RAID descriptor further comprises a second RAID sub-descriptor.

16 Claims, 5 Drawing Sheets

| 31 | 30 29 28 27 26 25 24 | 23 22 21 20 | 19 18 17 16 | 15 14 13 12 11 10 9 8 7 6 5 4 3 2 1 0 | |
|---|---|---|---|---|---|
| 0 | Reserved | DCmd | ScrNum | Reserved | 03-00H |
| | Status | Reserved | | Byte Count | 07-04H |
| | | | SAR1 | | 0B-08H |
| | | | DARP | | 0F-0CH |
| | | | NDA | | 0 | 13-10H |
| | | | SAR2 | | 0 | 17-14H |
| | | | SAR3 | | 0 | 1B~18H |
| | | | SAR4 | | 0 | 1F-1CH |
| | | | SAR5 | | 0 | 23-20H |
| | | | SAR6 | | 0 | 27-24H |
| | | | SAR7 | | 0 | 2B-28H |
| | | | SAR8 | | 0 | 2F-2CH |
| | | | SAR9 | | 0 | 33-30H |
| | | | SAR10 | | 0 | 37-34H |
| | | | SAR11 | | 0 | 3B-38H |
| | | | SAR12 | | 0 | 3F-3CH |

| Bits | 31 30 29 28 27 26 25 24 23 22 21 20 19 18 17 16 15 14 13 12 11 10 9 8 7 6 5 4 3 2 1 0 | Address |
|---|---|---|
| | DARQ ... 0 | 03-00H |
| | K1 | K2 | K3 | K4 | 07-04H |

| 31–24 | 23–16 | 15–8 | 7–0 | Addr |
|---|---|---|---|---|
| DARQ | | | 0 | 03-00H |
| K1 | K2 | K3 | K4 | 07-04H |
| K5 | K6 | K7 | K8 | 0B-08H |
| K9 | K10 | K11 | K12 | 0F-0CH |
| K13 | K14 | K15 | K16 | 13-10H |
| Reserved | | | | 17-14H |
| Reserved | | | | 1B-18H |
| Reserved | | | | 1F-1CH |
| SAR13 | | | | 23-20H |
| SAR14 | | | | 27-24H |
| SAR15 | | | | 2B-28H |
| SAR16 | | | | 2F-2CH |
| Reserved | | | | 33-30H |
| Reserved | | | | 37-34H |
| Reserved | | | | 3B-38H |
| Reserved | | | | 3F-3CH |

RAID SYSTEM AND THE OPERATING METHOD FOR THE SAME

BACKGROUND OF THE INVENTION

1. Field of the Invention

The invention relates to Redundant Array of Inexpensive Disks (RAID) systems, and particular to RAID systems with RAID descriptors having compatibility for different RAID levels.

2. Description of the Related Art

In conventional RAID systems, a RAID descriptor works as an interface between the software and hardware, and is designed especially for one specific RAID algorithm. To realize two or more RAID algorithms, conventional RAID systems require distinct RAID descriptors for corresponding RAID algorithms. Because the RAID descriptors for distinct RAID algorithms are obviously different, software development thereof is complex and inconvenient.

BRIEF SUMMARY OF THE INVENTION

The invention provides Redundant Array of Inexpensive Disks (RAID) systems realizing a first RAID algorithm and a second RAID algorithm. The RAID system comprises an operating unit and a storage device storing a software. The software sets the RAID system to realize the first or the second RAID algorithm, provides disk locations of disk data required in the selected RAID algorithm, provides disk destination for at least one parity calculated by the selected RAID algorithm, and generates a RAID descriptor based on the selected RAID algorithm. The RAID descriptor works as an interface between the software and operating unit. The operating unit interprets the RAID descriptor according to the selected RAID algorithm. Based on information contained in the RAID descriptor, the operating unit obtains the disk locations of the disk data and the disk destination of the calculated parity. The selected RAID algorithm is realized by the operating unit based on the information in the RAID descriptor.

The invention further provides methods of operating RAID systems capable of running a first RAID algorithm and a second RAID algorithm. The method comprises setting the RAID system to realize the first or the second RAID algorithm, providing disk locations of disk data required in the selected RAID algorithm, providing disk destination for at least one parity calculated by the selected RAID algorithm, and generating a RAID descriptor based on the selected RAID algorithm. The RAID descriptor relates to the disk locations of the disk data and the disk destination of the calculated parity. The method disclosed by the invention further interprets the generated RAID descriptor according to the selected RAID algorithm and realizes the selected RAID algorithm based on information contained in the RAID descriptor.

The above and other advantages will become more apparent with reference to the following description taken in conjunction with the accompanying drawings.

BRIEF DESCRIPTION OF THE DRAWINGS

The invention can be more fully understood by reading the subsequent detailed description and examples with references made to the accompanying drawings, wherein:

FIG. 2 shows an embodiment of a first RAID sub-descriptor;

FIG. 4 shows an embodiment of a second RAID sub-descriptor; and

DETAILED DESCRIPTION OF THE INVENTION

The following description is made for the purpose of illustrating the general principles of the invention and should not be taken in a limiting sense. The scope of the invention is best determined by reference to the appended claims.

The invention provides Redundant Array of Inexpensive Disks (RAID) systems with RAID descriptors having compatibility for different RAID levels. The RAID system is capable of running both RAID 5 and RAID 6 without substantially modifying the software.

In RAID 5, a parity P (referred to here as first parity) is generated to mend data in disks. Unlike RAID 5, RAID 6 further generates an orthogonal parity Q (referred to here as second parity) by the formula:

$$Q = K1 \otimes D1 \oplus K2 \otimes D2 \oplus \ldots \oplus Kn \otimes Dn$$

where K1 to Kn are parameters for the second parity Q. In the invention, the second parity parameters K1 to Kn are contained in a RAID descriptor. D1 to Dn are disk data stored in different storage devices. '$\oplus$' marks Exclusive or (XOR) operation, and is realized by the hardware of the RAID system. The operator '$\otimes$' is the logic operation according to the algorithm defined by the RAID 6 system. The result of the operation may be obtained from the pre-calculated table according to the operands.

The disclosed RAID descriptor allows RAID systems to run RAID 5 and RAID 6 without substantially modifying the design of the software.

In the embodiment according to the invention, which is set to realize RAID 5, the RAID descriptor is implemented by a first RAID sub-descriptor. As the first RAID sub-descriptor acts as the interface between the software and the hardware, the RAID system is capable of running RAID 5. If the RAID system is set to realize RAID 6, the generated RAID descriptor not only comprises the first RAID sub-descriptor but also a second RAID sub-descriptor. The first RAID sub-descriptor and the second RAID sub-descriptor act as the interface between the software and the hardware for the operation of RAID 6. Thus, the RAID system is also capable of running RAID 6. The invention further comprises a RAID register, and the RAID system is set to realize RAID 5 or RAID 6 according to the value of the RAID register.

Figure 1:
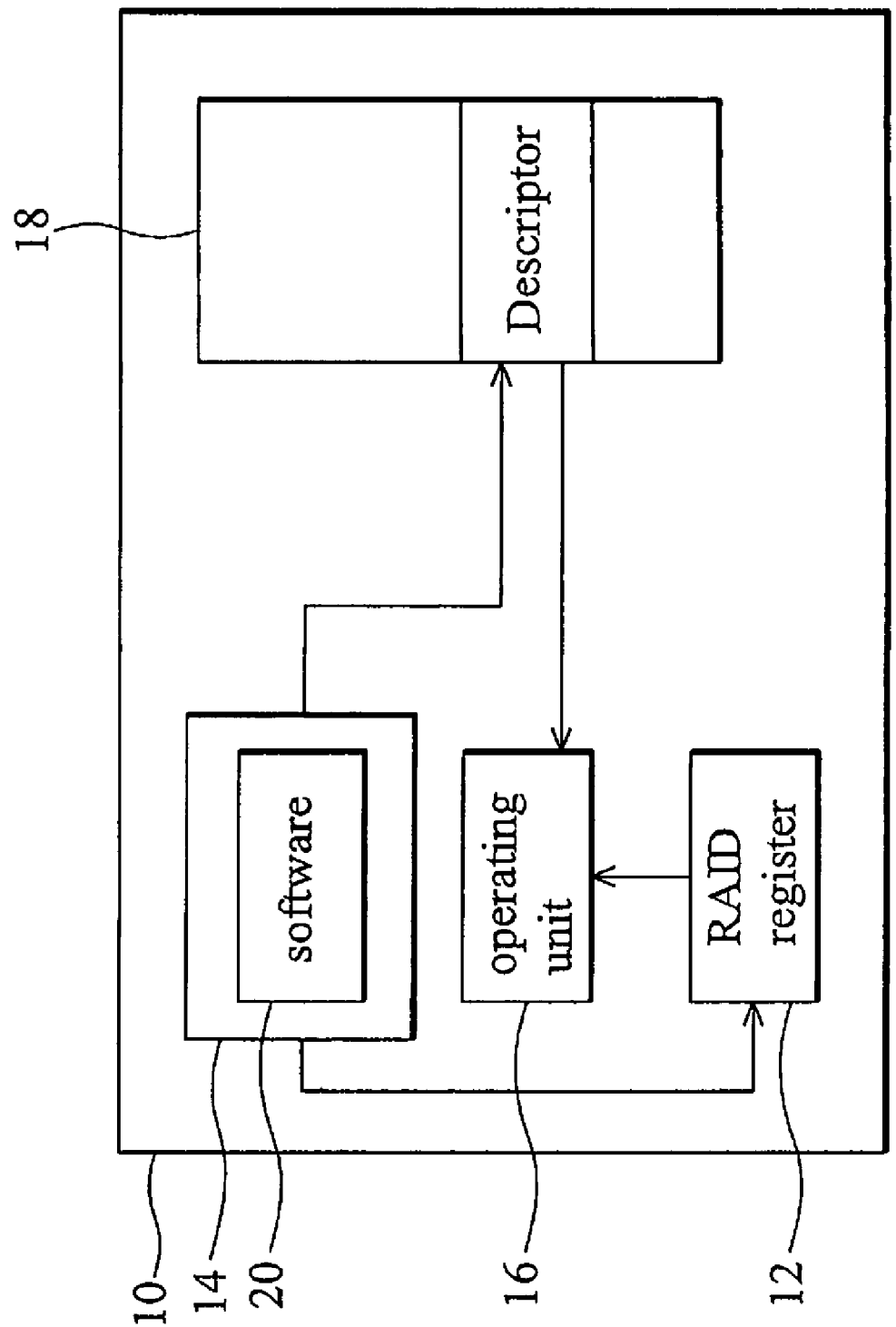
FIG. 1 shows a RAID system according to an embodiment of the present invention.

FIG. 1 shows an embodiment of the invention. RAID system 10 comprises an operating unit 16, a RAID register 12, and a storage device 14 storing a software 20. The status of the RAID register 12 is set by the software 20. According to the setting of the RAID register 12, the software 20 generates a RAID descriptor related to the selected RAID algorithm and stores it into a memory 18. After determining the status of the RAID register 12, the operating unit 16 executes the selected RAID algorithm (RAID 5 or RAID 6) based on the information contained in the RAID descriptor.

For example, to realize RAID 5, the software 20 sets the RAID register 12 to a first status (representing RAID 5) and generates a RAID descriptor comprising a first RAID sub-descriptor. After determining the status of the RAID register 12, the operating unit 16 implements RAID 5 based on the information contained in the RAID descriptor.

To realize RAID 6, the software 20 sets the RAID register 12 to a second status (representing RAID 6) and generates a RAID descriptor comprising the first RAID sub-descriptor and a second RAID sub-descriptor. After determining the status of the RAID register 12, the operating unit 16 implements RAID 6 based on the information contained in the RAID descriptor.

FIG. 2 shows an embodiment of the first RAID sub-descriptor. The first RAID sub-descriptor 100 comprises information about a descriptor command (DCmd), memory address of a space storing disk destination of a first parity (DARP), and memory addresses of spaces storing disk locations of the disk data (SAR1 to SAR12). In the embodiment shown in FIG. 2, the first RAID sub-descriptor 100 has a disk data information capacity of twelve, SAR1 to SAR12. In 32-bit computer systems, the length of the RAID descriptor is 16DW (double word). In other embodiments having longer descriptor length, the space for indicating memory addresses relating to disk data increases and more disk data can be taken into account in the selected RAID algorithm. In the embodiment shown in FIG. 2, ScrNum indicates the count of in-used data sources which may be defined by user.

Figure 3:
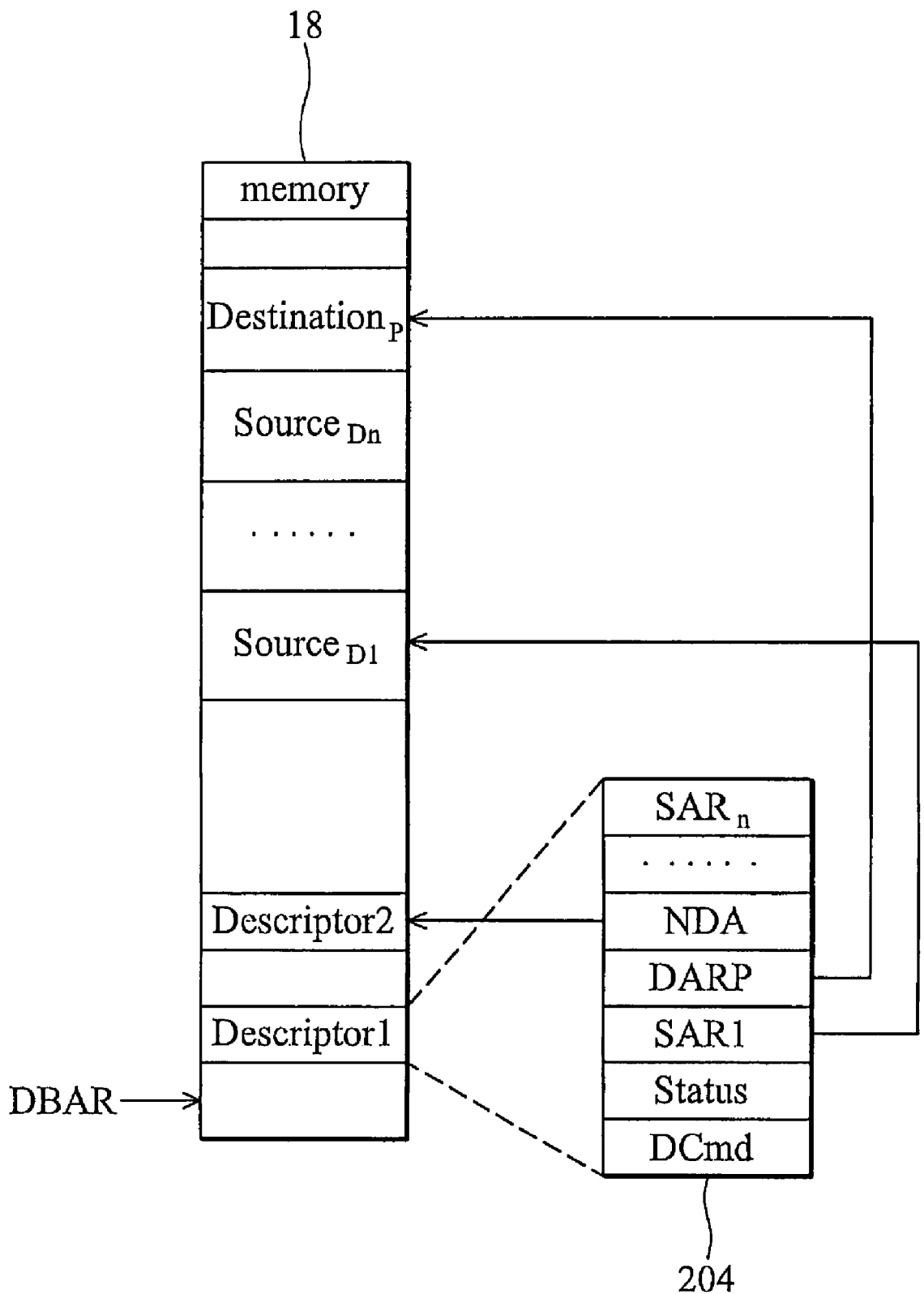
FIG. 3 shows the embodiment of the present invention realizing RAID 5.

FIG. 3 shows first RAID sub-descriptor operation when the RAID system 10 is set to realize RAID 5. Software 20 sets the RAID register 12 to the first status. Software 20 also generates the necessary information for the operation of RAID 5, such as the locations of disk data (Source$_{D1}$ to Source$_{Dn}$) and the destination location of the current operation (Destination$_p$), and then the information is stored in the memory 18. More particularly, Source$_{D1}$ to Source$_{Dn}$ indicate disk locations of the disk data D1 to Dn. Destination$_p$ represents disk destination of the first parity P calculated by RAID 5. The operating unit 16 acquires disk data D1 to Dn from disks according to Source$_{D1}$ to Source$_{Dn}$ in the memory 18. Based on disk data D1 to Dn, the operating unit 16 calculates the first parity P. Then, the operating unit 16 stores the calculated first parity P to the disks according to Destination$_p$.

After preparing Source$_{D1}$ to Source$_{Dn}$ and Destination$_p$ in the memory 18, the software 20 further generates a RAID descriptor (such as Descriptors1) and stores the generated RAID descriptor in the memory 18. The RAID descriptor Descriptors1 comprises a first RAID sub-descriptor 204. The first RAID sub-descriptor 204 comprises DCmd, DARP, and SAR1 to SARn. DCmd shows a descriptor command. DARP points to a space in memory 18 storing Destination$_p$, the disk destination of the first parity P. SAR1 to SARn show the addresses of spaces in memory 18 storing Source$_{D1}$ to Source$_{Dn}$, the disk locations of the disk data D1 to Dn. The value in a beginning register DBAR indicates the memory address from which a series of RAID descriptors (Descriptor1, Descriptor2 and so on) start.

The operating unit 16 acquires the first RAID descriptor Descriptor1 from the memory 18 according to the beginning register DBAR. According to SAR1 to SARn contained in the first RAID sub-descriptor 204, the operating unit 16 acquires Source$_{D1}$ to Source$_{Dn}$ from the memory 18, respectively. The operating unit 16 acquires disk data D1 to Dn from disks according to SourceD1 to SourceDn, respectively. In the embodiment shown in FIG. 3, the descriptor command DCmd is a RAID 5 command. The operating unit 16 calculates the first parity P based on the disk data D1 to Dn by executing the RAID 5 command. According to DARP of the first RAID sub-descriptor 204, Destination$_p$ is obtained from the memory 18. Based on Destination$_p$, the operating unit 16 stores the calculated first parity P to the disks.

Figure 5:
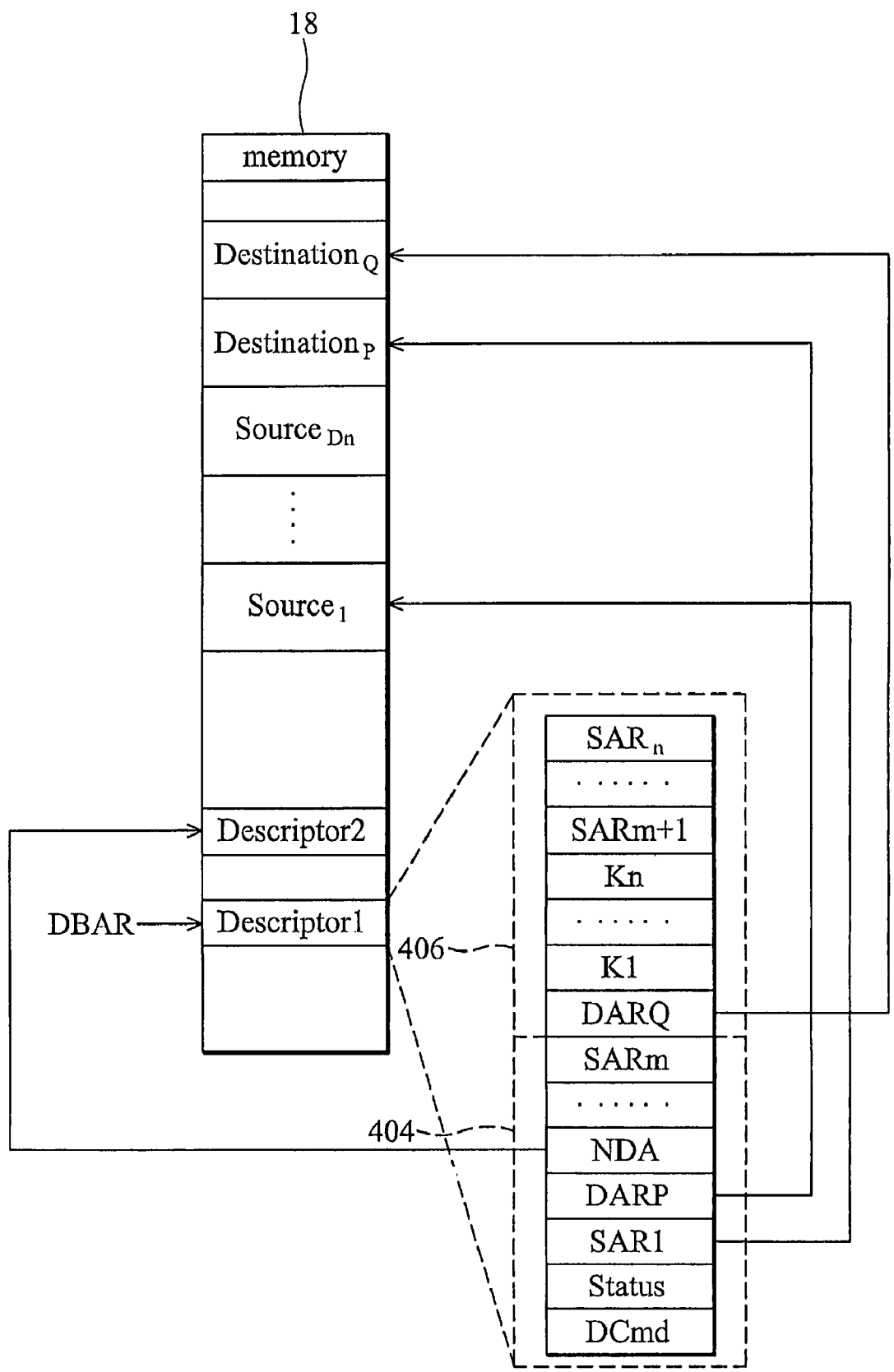
FIG. 5 shows the embodiment of the present invention realizing RAID 6.

FIG. 4 shows an embodiment of the second RAID sub-descriptor. The length of the second RAID sub-descriptor 300 is 16 double word, and the second RAID sub-descriptor 300 comprises memory address of a space storing disk destination of a second parity (DARQ), a plurality of second parity parameters (K1 to K16 here), and memory addresses of spaces storing disk locations of a plurality of additional disk data (SAR13 to SAR16 here). The additional disk data (SAR13 to SAR16 here) is required in the selected RAID algorithm without mention in the first RAID sub-descriptor. With the spaces storing information of the additional disk data, the second RAID sub-descriptor 300 allows the RAID algorithm to take more disk data into consideration. The length of the second RAID sub-descriptor is not limited to 16DW, and may be designed according to the amount of disk data required in the RAID algorithm. FIG. 5 shows operation of the RAID descriptor for RAID 6. To realize RAID 6, in addition to a first descriptor 404, each RAID descriptor further comprises a second descriptor 406. SAR1 to SARm in the first RAID sub-descriptor 404 and SARm+1 to SARn in the second RAID dub-descriptor 406 allow the RAID algorithm to take n disk data into account. In some embodiments utilizing the first and second RAID sub-descriptors 100 and 300 to implement the RAID descriptor, the maximum disk data to be taken into account is 16 since the total space for storing information relating to disk data (SAR1 to SAR16) and the total space for storing the second parity parameters (K1 to K16) are both 16.

Comparing FIG. 5 with FIG. 3, the software 20 for RAID 6 not only prepares Source$_{D1}$ to Source$_{Dn}$ and Destination$_p$ on the memory 18, but also prepares Destination$_Q$ indicating the disk destination storing the calculated second parity Q. As shown in FIG. 5, the RAID descriptor for RAID 6 comprises a first RAID sub-descriptor 404 and a second RAID sub-descriptor 406. The first RAID sub-descriptor 404 is similar to that shown in FIG. 3. The second RAID sub-descriptor 406 comprises DARQ, SARm+1 to SARn, and a plurality of second parity parameters K1 to Kn. DARQ indicates memory address of a space storing Destination$_Q$. SARm+1 to SARn indicate memory addresses of spaces storing Source$_{Dm+1}$ to Source$_{Dn}$. SAR1 to SARn are contained in the first and second RAID sub-descriptors 404 and 406. A beginning register DBAR indicates the memory from which the RAID descriptors start.

According to the beginning pointer DBAR, the operating unit 16 acquires the first RAID descriptor Descriptor1 from the memory 18. According to SAR1 to SARn in the first and second RAID sub-descriptors 404 and 406 of the descriptor Descriptor1, the operating unit 16 acquires Source$_{D1}$ to Source$_{Dn}$ from the memory 18. According to Source$_{D1}$ to Source$_{Dn}$, the operating unit 16 acquires disk data D1 to Dn from disks. In the embodiment shown in FIG. 5, the descriptor command DCmd is a RAID 6 command. The operating unit 16 calculates a first parity P based on the disk data D1 to Dn, and calculates a second parity Q based on the disk data D1 to Dn and the second parity parameters K1 to Kn. According to DARP and DARQ, the operating unit 16 acquires Destination$_p$ and Destination$_Q$ from the memory 18 and stores the first and second parities P and Q to the disks according to Destination$_p$ and Destination$_Q$, respectively.

As shown in FIG. 2, the first RAID sub-descriptor 100 further contains information about the address of next RAID descriptor (NDA). Using FIGS. 3 and 5 as examples, the operating unit 16 continues to the second RAID descriptor Descriptor2 according to the NDA contained in the first RAID descriptor Descriptor1.

In the embodiment shown in FIG. 2, the first RAID sub-descriptor 100 further comprises information about the status of the RAID descriptor.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded to the broadest interpretation so as to encompass all such modifications and similar arrangements.

What is claimed is:

1. A Redundant Array of Inexpensive Disks (RAID) system capable of realizing a first RAID algorithm and a second RAID algorithm, and comprising:
   for a storage device storing a software, the software setting the RAID system to realize the first RAID algorithm or the second RAID algorithm, providing disk locations of disk data required in the selected RAID algorithm, providing disk destination for at least one parity calculated by the selected RAID algorithm, and generating a RAID descriptor based on the selected RAID algorithm, the RAID descriptor relating to the disk locations of the disk data and the disk destination of the at least one parity; and
   an operating unit, interpreting the RAID descriptor according to the selected RAID algorithm, and realizing the selected RAID algorithm based on information contained in the RAID descriptor;
   wherein the RAID descriptor is implemented by a first RAID sub-descriptor when the RAID system is set to realize the first RAID algorithm;
   wherein the RAID descriptor is implemented by the first RAID sub-descriptor and a second RAID sub-descriptor when the RAID system is set to realize the second RAID algorithm.

2. The RAID system as claimed in claim 1, further comprising a RAID register indicating the selected RAID algorithm.

3. The RAID system as claimed in claim 1, further comprising a memory storing the RAID descriptor, the disk locations of the disk data, and the disk destination of the calculated parity.

4. The RAID system as claimed in claim 1, wherein when the RAID system is set to realize the first RAID algorithm, the operating unit obtains the disk locations of the disk data and the disk destination of the calculated parity from the first RAID sub-descriptor, processes the disk data according to the first RAID algorithm to calculate a first parity, and stores the first parity according to the disk destination.

5. The RAID system as claimed in claim 1, wherein when the RAID system is set to realize the second RAID algorithm, the operating unit obtains the disk locations of the disk data and the disk destinations of calculated parities from the first and second RAID sub-descriptors, processes the disk data according to the second RAID algorithm to calculate a first parity and a second parity, and stores the first and second parities according to the disk destinations.

6. The RAID system as claimed in claim 1, wherein the first RAID sub-descriptor comprises a descriptor command, memory address of a space storing disk destination of a first parity, and memory addresses of spaces storing disk locations of the disk data.

7. The RAID system as claimed in claim 6, wherein the first RAID sub-descriptor further comprises the address of the next RAID descriptor, the disk data required in the selected RAID algorithm, and status of the RAID descriptor.

8. The RAID system as claimed in claim 6, wherein the second RAID sub-descriptor comprises memory address of a space storing disk destination of a second parity, a plurality of second parity parameters, and memory addresses of spaces storing disk locations of a plurality of additional disk data, wherein the additional disk data is required in the selected RAID algorithm without mention in the first RAID sub-descriptor.

9. The RAID system as claimed in claim 1, wherein the first RAID algorithm is implemented as RAID 5, and the second RAID algorithm is implemented as RAID 6.

10. A method of operating a Redundant Array of Inexpensive Disks (RAID) system capable of running a first RAID algorithm and a second RAID algorithm, comprising:
    setting the RAID system to realize the first or the second RAID algorithm;
    providing disk locations of disk data required in the selected RAID algorithm;
    providing disk destination for at least one parity calculated by the selected RAID algorithm;
    generating a RAID descriptor based on the selected RAID algorithm, wherein the RAID descriptor relates to the disk locations of the disk data and the disk destination of the at least one parity; and
    interpreting the RAID descriptor according to the selected RAID algorithm, and realizing the selected RAID algorithm based on information contained in the RAID descriptor;
    wherein the RAID descriptor is implemented by a first RAID sub-descriptor when the RAID system is set to realize the first RAID algorithm;
    wherein the RAID descriptor is implemented by the first RAID sub-descriptor and a second RAID sub-descriptor when the RAID system is set to realize the second RAID algorithm.

11. The method as claimed in claim 10, further comprising, when the RAID system is set to realize the first RAID algorithm:
    obtaining the disk locations of the disk data and the disk destination of the calculated parity from the first RAID sub-descriptor;
    processing the disk data according to the first RAID algorithm to calculate a first parity; and
    storing the first parity according to the disk destination.

12. The method as claimed in claim 10, further comprising, when the RAID system is set to realize the second RAID algorithm:
    obtaining the disk locations of the disk data and the disk destinations of calculated parities from the first and second RAID sub-descriptors;
    processing the disk data according to the second RAID algorithm to calculate a first parity and a second parity; and
    storing the first and second parities according to the disk destinations.

13. The method as claimed in claim 10, wherein the first RAID sub-descriptor comprises a descriptor command, memory address of a space storing disk destination of a first parity, and memory addresses of spaces storing disk locations of the disk data.

14. The method as claimed in claim 13, wherein the first RAID sub-descriptor further comprises the address of the next RAID descriptor, the amount of the disk data required in the selected RAID algorithm, and status of the RAID descriptor.

15. The method as claimed in claim 13, wherein the second RAID sub-descriptor comprises the memory address of a space storing disk destination of a second parity, a plurality of second parity parameters, and memory addresses of spaces storing disk locations of a plurality of additional disk data, wherein the additional disk data is required in the selected RAID algorithm without mention in the first RAID sub-descriptor.

16. The method as claimed in claim 10, wherein the first RAID algorithm is implemented as RAID 5, and the second RAID algorithm is implemented as RAID 6.

* * * * *